April 14, 1931. L. J. CAMPBELL 1,800,928
TRANSMISSION MECHANISM
Filed Aug. 23, 1930  3 Sheets-Sheet 1

Inventor,
Leon J. Campbell,
By S. George Tate
Attorney

Patented Apr. 14, 1931

1,800,928

UNITED STATES PATENT OFFICE

LEON J. CAMPBELL, OF BUCHANAN, MICHIGAN

TRANSMISSION MECHANISM

Application filed August 23, 1930. Serial No. 477,362.

This invention relates to new and useful improvements in transmission mechanisms generally, although particularly to transmissions of motor vehicles.

Among the several objects of my invention are to provide a construction which will not increase the pitch diameters of gears now in common use in motor vehicle transmissions; to provide a construction which will maintain the positive clutch of a diameter that will not permit of a tooth velocity great enough to be injurious to the teeth if synchronizing is not effected; to provide a construction wherein the shifter fork will be held as closely to the clutch shaft as possible wherein the working velocity will be reduced to a minimum to thereby produce an easy shifting movement; to provide a gear which will temper and harden readily and which can be made easily by automatic machinery; to provide a constant gear with bearings sufficient to support the gear from any distortion while being clutched; to provide a transmission mechanism which is readily applicable to motor vehicles now in use; to provide a control mechanism for first effecting the synchronizing of a driven rotary part to a driving shaft by means of a friction clutch and for subsequently coupling said part and shaft by a positive clutch; to provide a single control lever which during movement in a single direction will successively close the friction clutch, then open the same, and then close the positive clutch; and to provide such a mechanism with a standard control movement of the lever.

With these and other objects in view which will more full appear, the nature of the invention will be more clearly understood by following the description, the appended claims, and the several views illustrated in the accompanying drawings.

In the accompanying drawings:—

Like reference numerals designate corresponding parts throughout the several figures of the drawings.

Referring to the accompanying drawings, my invention includes a clutch or driving shaft 5 and a driven shaft 6 arranged in alinement with the driving shaft. The driving shaft is provided with a bore 7 in its inner end for receiving a pilot 8 in the adjacent end of the driven shaft 6. The rear end of the driven shaft is connected by a flexible coupling 9 to a third shaft 10 which in turn drives the usual differential of a motor vehicle. The shafts 5 and 6 are suitably journaled in a gear casing 11 and fixed in this gear casing is a lay shaft 12 on which is journaled a sleeve 13 having the following gears all connected thereto to rotate therewith, a constant gear 14, an intermediate gear 15, a first or low gear 16, and a reverse gear 17. Fixed to the driving shaft 5 is a gear 18 which is in constant mesh with the gear 14 and consequently when the driving shaft 5 is rotated the sleeve 13 and the gears fixed thereto will be rotated, the gear coupling 18, 14 forming a speed reduction gearing.

The shaft 5 at its inner end is provided with a spline 19. The driven shaft 6 adjacent the inner end thereof is provided with a spline 20 which is of the same diameter and has the same number and the same size of teeth as the spline 19. The driven shaft 6 is also provided with a spline 21 arranged in spaced relation to the spline 20 and with a bearing 22 located between said splines for revolvably supporting a gear 23 having a hub 24 which extends towards the spline 20.

The driving shaft 5 is adapted to be directly connected to the driven shaft 6 and thereby operate the driven shaft at high speed through the medium of a coupling A which includes a friction clutch and a positive clutch, the former being first operated to frictionally connect the two shafts whereby they will operate in synchronism and the latter being operated to subsequently effect a positive connection between the shafts immediately after the frictional clutch has been uncoupled.

The friction clutch includes a driving clutch member or cone 25 and a driven clutch member 26. The driving clutch member 25 is fixed to the driving shaft 5 and is located at the inner end of the spline 19. The driven clutch member 26 surrounds the spline 20 of the driven shaft 6 and is provided with internal teeth 27 which are always in engagement with the spline 20. This driven clutch member 26 includes a peripheral tapered flange 28 which is adapted to engage an annular shoe carried by the driving clutch member 25.

The positive clutch comprises the flange 28 which overhangs the spline 19 and forms an annular recess for receiving a slidable ring 30 which is bodily movable with the driven clutch member 26 longitudinally of the alined shafts 5 and 6. The ring 30 is retained within the movable clutch member 26 by an annular keeper 31 fixed to said member. The ring 30 is provided with internal teeth 32 which always slidably engage the spline 19 but which are adapted to also slidably engage the spline 20, when the driven clutch member 26 is moved in the proper direction, and thereby positively couple the two shafts 5 and 6.

It will, therefore, be seen that in the neutral position of the driven clutch member 26 the driven shaft 6 is idle. When, however, the driven clutch member 26 is moved to the left as viewed in Figure 1, the friction clutch will be first coupled or closed and inasmuch as the driving clutch member 25 is fixed to rotate with the driving shaft 5 and the driven clutch 26 is splined to rotate with the shaft 6, said shaft 6 will be rotated in synchronism with the driving shaft 5. It will also be apparent that by quickly shifting the driven clutch member to the right as viewed in Figure 1, the friction clutch will be first uncoupled or opened and immediately thereafter the ring 30 will be moved to the right so that the teeth 32 thereof which engage the spline 19 will also become engaged with the spline 20 and thereby positively and directly connect the driven shaft 6 to the shaft 5.

In order to indirectly drive the shaft 6 at second or intermediate speed through the medium of the gear 15, I have provided a gear coupling B which includes a friction clutch and a positive clutch.

The friction clutch includes a driving clutch member or cone 33 and a driven clutch member 34, similar to the clutch members 25 and 26. The driving clutch member 33 is fixed to rotate with the gear 23 and the driven clutch member 34 is provided with internal teeth 35 which engage the spline 20. The driven clutch member 34 is provided with an annular tapered flange 36 which is spaced from the hub 24 to form an annular recess.

The positive clutch includes a ring 37 mounted in the recess and having internal teeth 38 which slidably engage a spline 39 formed on the hub 24 of the gear 23.

Figures 1, 4, 5, 6:
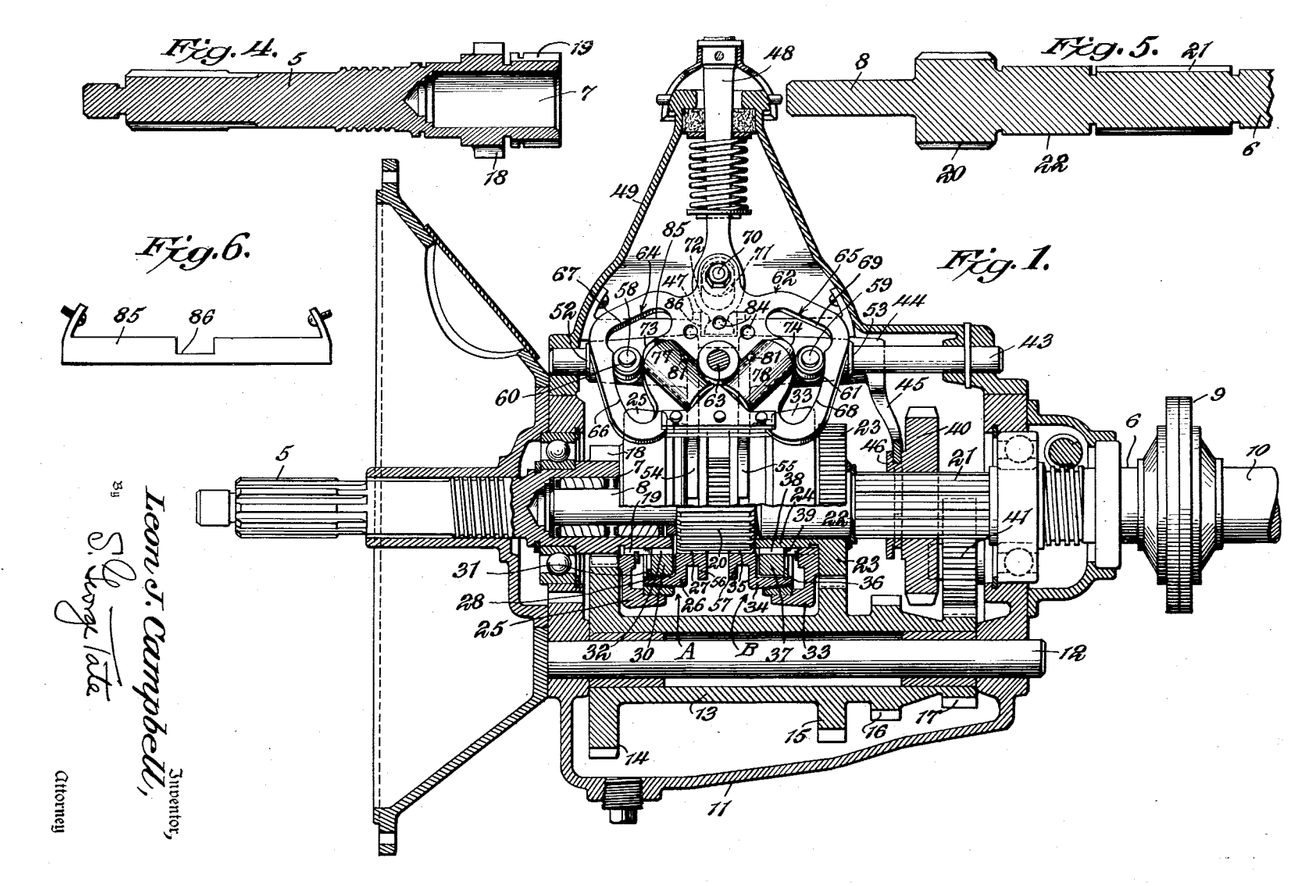
Figure 1 is a vertical longitudinal sectional view of a transmission mechanism embodying my invention, parts thereof being shown in elevation.
Figure 4 is a longitudinal sectional view of the driving shaft.
Figure 5 is a longitudinal sectional view of the driven shaft.
Figure 6 is a side elevation of the guard plate for the control lever.
Figure 2:
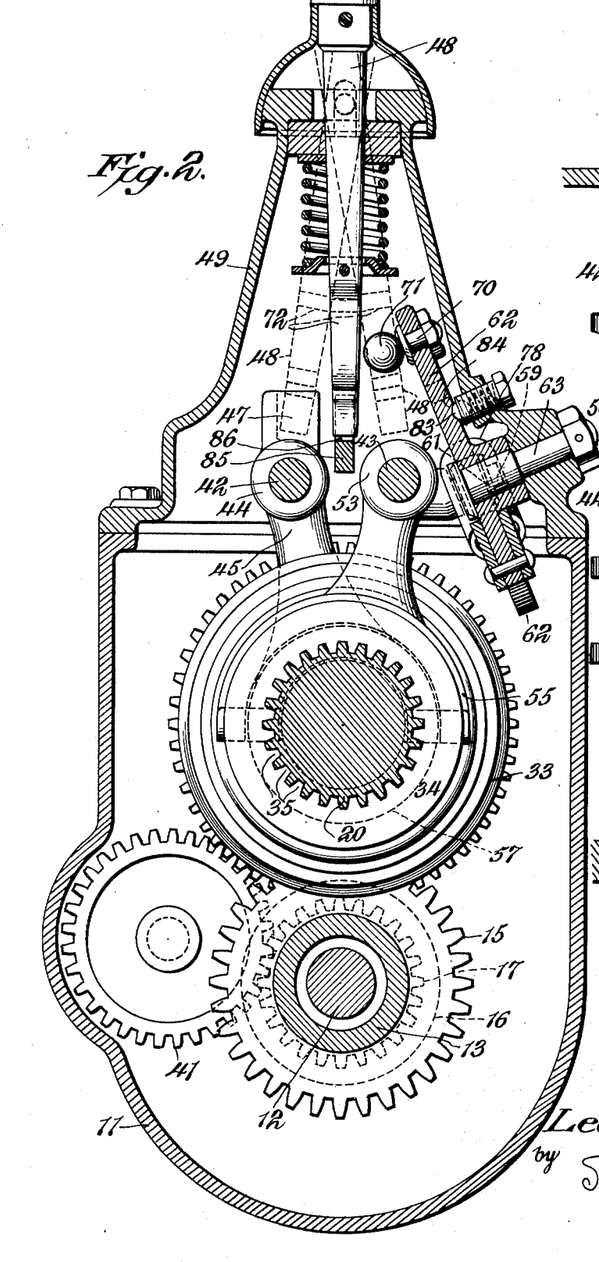
Figure 2 is a vertical transverse section taken centrally thereof.
Figure 3:
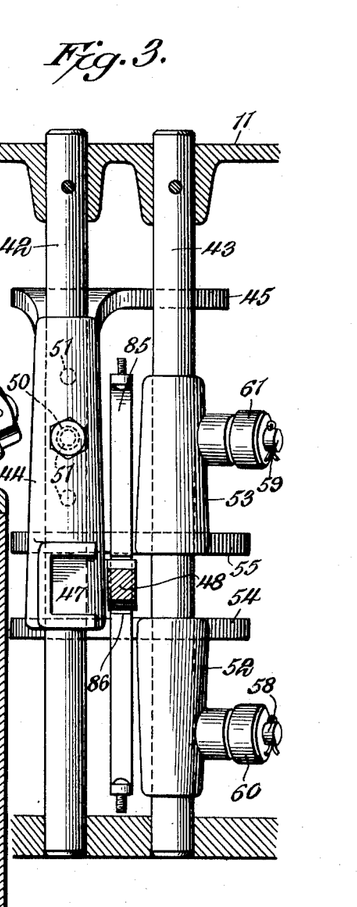
Figure 3 is an enlarged plan view showing the mountings for the shifter forks.

It will, therefore, be seen that when the driven clutch 34 is in its neutral position the gear 23 will be rotated about the shaft 6 by the intermediate gear 15 with which it is in constant mesh, without however communicating motion to the shaft 6. When, however, the driven clutch member 34 is moved to the right as shown in Figure 1, the friction clutch will be coupled or closed and consequently the shaft 6 will be rotated by the gear 23 in synchronism with the gear 23 and the hub 24 thereof. If the driven clutch member 34 is then moved to the left as viewed in Figure 1, the friction clutch will be opened, the ring 37 will be moved with the member 34 and the teeth 38 of said ring will immediately mesh with the spline 39 of the hub 24 and with the spline 20, thereby closing the positive clutch and effecting a positive although indirect driving connection between the shafts 5 and 6.

Slidably mounted on the spline 21 so as to rotate with the driven shaft 6 is a gear 40 which is adapted to be moved to engage the first or low gear 16, or to engage an idler 41 which is journaled in the casing 11 and is in constant mesh with the reverse gear 17.

In order to operate the driven shaft 6 in reverse, or at high speed, or at intermediate speed, I have provided the following control mechanism:—

Fixedly mounted in the casing 11 above the driven shaft 6 and disposed at equal distances on opposite sides of a vertical plane containing the longitudinal axis of said shaft 6, is a pair of horizontally disposed supporting rods 42 and 43 respectively. Slidably mounted on the rod 42 is a sleeve 44 having an integral forked arm or shifter fork 45 which engages a grooved hub 46 of the gear 40. Consequently when the sleeve 44 is shifted longitudinally of its supporting rod 42, the gear 40 will be moved into mesh with the first or low gear 16, or with the idle gear 41 which is in constant mesh with the reverse gear 17. Rigidly connected to the sleeve 44 and extending upwardly therefrom is a socket 47 having a side opening toward the rod 43. A control lever 48 is fulcrumed in a housing 49 for universal movements, the housing being secured to the casing 11 above the driven shaft 6. The supporting rods 42 and 43 are located above the top of the casing 11 and consequently the lower portion of the housing 49 receives said rods. The lower end of the control lever 48 extends downwardly into the housing 49 and terminates at a point slightly above the horizontal plane of the supporting rods 42 and 43, and the extreme lower end of the lever is out of the socket 47 when said lever is in its neutral position. Thus when the operating lever 48 is moved sidewise while in neutral position so that the lower end thereof engages in the socket 47, the lever upon forward movement will cause the gear 40 to mesh with the reverse idle gear 41, or when the lever is moved rearwardly will cause the gear 40 to mesh with the low gear 16. A spring pressed ball check 50 is carried by the sleeve 44 for engagement with any one of three recesses 51 formed in the supporting rod 42 to frictionally retain the sleeve in its forward position, or in its backward position, or in its neutral position.

In order to actuate the couplings A and B and thereby effect a direct coupling between the driving shaft 5 and the driven shaft 6 to rotate the latter at high speed, or to effect a coupling between the intermediate or second speed gear 15 and the driven shaft 6 whereby the latter will be driven at an intermediate speed, I have provided the following mechanism which is operable by the control lever 48:—

Figures 7, 8, 9, 10, 11:
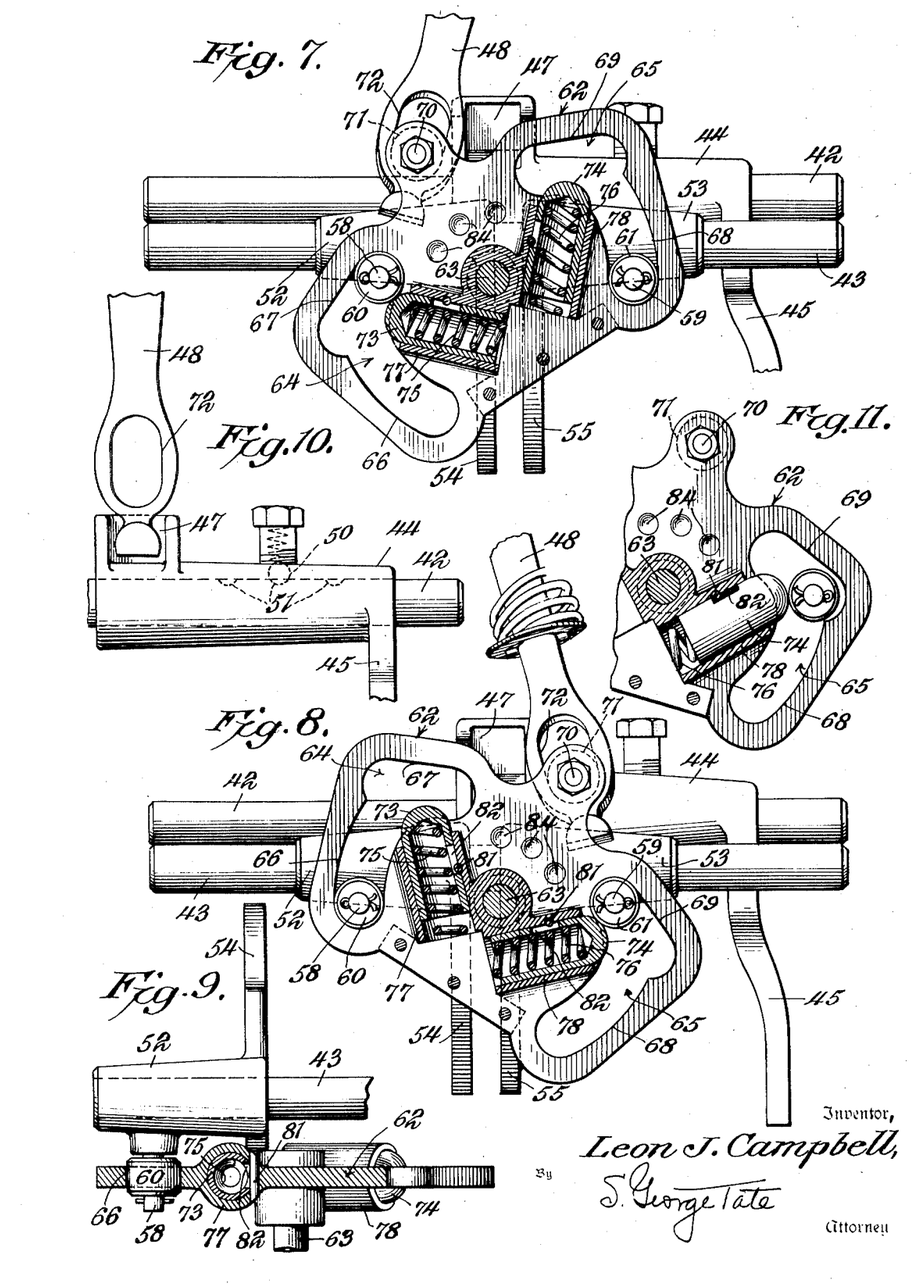
Figure 7 is a side elevation showing the cam plate in position when the high speed coupling is closed.
Figure 8 is a similar view but showing the cam plate in position when the intermediate speed coupling is closed.
Figure 9 is an enlarged detail view of a shifter fork connection with the cam plate.
Figure 10 is a detail view showing the lower end of the control lever in its relation to the socket of the shifter fork sleeve.
Figure 11 is a detail view showing particularly the spring plunger mounting.

Slidably mounted on the supporting rod 43 are two sleeves 52 and 53 which are respectively provided with forked shifter arms 54 and 55 which are respectively engaged with grooved hubs 56 and 57 of the driven clutch members 26 and 34 of the couplings A and B. Extending laterally from and rigid with the sleeves 52 and 53 are stub shafts 58 and 59 and journaled on said shafts are rollers 60 and 61 respectively. A cam plate 62 is centrally pivoted upon a stud shaft 63 fixed to the housing 49, the plate being located between the supporting rod 43 and the adjacent side of the housing. The longitudinal axis of the stud shaft 63 is disposed in a plane transverse to the longitudinal axis of the supporting rod 43 so as to permit the cam plate to be oscillated in a plane parallel with said supporting rod. The cam plate 62 is provided on opposite sides of its pivot 63 with oppositely formed cam slots 64 and 65. The cam slot 64 includes a lower concentric portion 66 which merges into an upper eccentric portion 67 extending inwardly toward the axis of the plate and wider than the portion 66. The cam slot 65 includes a concentric lower portion 68 which merges into an upper eccentric portion 69 extending inwardly toward the axis of the plate and wider than the portion 68. Fixed to a pin 70 which is secured to the cam plate 62 above the axis 63 and intermediate the cam slots 64 and 65, is a ball 71 which is adapted to be engaged by the walls of a recess or opening 72 formed in the lower portion of the control lever 48. This opening 72 is elongated so that the major axis thereof extends along the control lever. Mounted on the cam plate 62 are radially movable plungers 73 and 74 which are constantly urged outwardly by springs 75 and 76 towards the eccentric portions 67 and 69 of the cam grooves 64 and 65 of the cam plate 62, the outer ends of the plungers normally engaging the rollers 60 and 61 respectively. The plungers are mounted in barrels 77 and 78 fixed to the cam plate, and the springs 75 and 76 function to urge the plungers outwardly, the movements of the plungers being limited by pin and slot connections 81 and 82 between the plungers and the barrels. The control lever 48, when moved from neutral position laterally toward the cam plate 62, becomes connected with the cam plate when the opening 72 at the lower end of the lever takes over the ball 71 on the cam plate. The lever may then be swung either forwardly or backwardly and thereby swing the cam plate 62 in a direction opposite to the movement of the lever, as shown in Figures 7 and 8. The rollers 60 and 61 which are carried by the sleeves 52 and 53 are constantly in the cam slots 64 and 65, and consequently the forward movement of the lever will effect a closing of the coupling B and thereby rotate the driven shaft 6 at intermediate speed, and the backward movement of the lever will effect a closing of the coupling A and thereby rotate the driven shaft 6 at high speed.

It will be observed that when the cam plate 62 is in its neutral position, as shown in Fig. 1, the rollers 60 and 61 are located at the upper ends of the concentric portions 66 and 68 of the cam slots 64 and 65, and that the plungers 73 and 74 project into the cam slots above the rollers into the path of the same to releasably hold the cam plate and the clutches in neutral position. When the cam plate 62 is swung to close the coupling B, as shown in Fig. 8, the plunger 74 in the initial movement of the plate is carried downward therewith against the roller 61. The latter at this time being in the concentric portion 68 of the cam slot 65 and having a diameter substantially equal to the width of the slot cannot move either forward or backward. Consequently, the roller as the plunger moves downward over it, moves the plunger 74 into its barrel against the tension of the spring 76 and permits the roller to pass over the plunger. As soon as the cam plate has been moved sufficiently to bring the widened portion 69ª of the slot opposite the roller, the plunger is released and the tension of its spring 76 shifts the roller rearward across the slot to close the friction clutch to frictionally connect the gear 23 with the shaft 6. In the continued movement of the cam plate through the lever 48, the outer edge of the eccentric portion 69 of the cam slot is brought into engagement with the roller 61, and the latter is moved forward to withdraw the movable member 34 of the friction clutch from the fixed member 33 thereof to open the clutch. A continued movement of the cam plate in the direction indicated continues the movement of the clutch member 34 and draws the member 37 of the positive clutch partially off the hub of the gear 23 and onto the splined portion 20 of the shaft 6 to positively connect such parts. The internal teeth of the clutch member 37 will enter into the spaces between the splines 20 as the gear 23 and shaft 6 have been previously synchronized by the friction clutch. The engagement and disengagement of the friction clutch and the engagement of the positive clutch is all accomplished in the throw of the lever 48 in the direction required to make the speed change desired, without the operator being conscious of the action of the two clutches. The portion 69ª of the cam slot is made wide enough to permit the wear of the friction clutch to be automatically taken up by the roller 61 in its movement by the plunger 74. In the movement of the cam plate in the opposite direction, that is, back toward the position shown in Fig. 1, the inner edge of the eccentric portion of the slot acts on the roller 61 to move the movable member 34 of the friction clutch rearward to carry the member 37 of the positive clutch completely back on the hub 24, thereby disconnecting gear 23 from shaft 6. The plunger 74, at this time being below the roller 61 rides upward over it, and acts to reengage the friction clutch as the roller passes the wide portion 69ª of the cam slot. As this portion is at the junction of the eccentric and concentric portions of the slots, the roller is drawn into the concentric portion in the continued movement of the plate and re-opens the friction clutch. It will be noted that the movable member 34 of the friction clutch and the member 37 of the positive clutch are connected for movement in unison, thereby permitting actuation of the positive clutch through the movement of the friction clutch. With the member 37 rotatably carried by the member 34, the member 37 may rotate with either or both shafts when connected therewith without interference by member 34.

When the roller 61 passes over the plunger 74 into the concentric portion of the cam slot, the clutch mechanism B is in neutral and so is the shift or control lever 48. The action of the clutch mechanism of the coupling A is the same as described for the coupling B. When both are in neutral, as shown in Fig. 1, the plungers 73, 74 are above the rollers 60, 61 and hold the cam plate and connected parts in neutral. This closing of the coupling B has no effect on the coupling A because during the time the cam plate is being swung from neutral to the right as above described, the roller 60 is riding in the concentric portion 66 of the cam groove 64.

It will, therefore, be readily apparent without further description, that when it is desired to close the coupling A, the cam plate is swung to the left, as shown in Fig. 7, and the roller 60, cam groove 64, shifter fork 54, friction clutch 20, 25, 26, and the positive clutch 19, 20, 30, are operated to first close the friction clutch, and then open the friction clutch and then close the positive clutch. During this operation, the roller 61 is riding in the concentric portion 68 of the cam groove 65 and consequently the operation of the coupling A has no effect on the coupling B.

A spring pressed ball check 83 is mounted on the housing 49 for engagement with any one of three recesses 84 in the cam plate 62 to retain the same in its forward position, or in its backward position, or in its neutral position.

Rigidly secured to the housing 49 and disposed between the supporting rods 42 and 43 is a guard plate 85 having a slot 86 centrally formed therein. This guard plate retains the control lever 48 from being shifted either to the front or to the rear when in neutral position.

In each of the couplings A and B, it will be observed that the positive clutch member (30 or 37) is splined on the shaft section to which the fixed member of the friction clutch is secured, and in normal position, that is, in declutched position, lies entirely within the confines of the shaft on which said fixed member is carried. It will also be noted that when the positive clutch member is in clutching position, it spans the joint or space between the shaft sections which it connects. In other words, a portion of the positive clutch member remains connected with the shaft section on which it is normally mounted, while the remaining portion of the clutch member extends across the joint and is in positive engagement with the splines of the adjacent shaft section. By reason of this arrangement, it is possible to confine the clutch action of the positive clutch to the peripheral portions of the shafts with which the clutch member co-acts, and thus permit the use of splines on said shafts for the positive clutch. This enables the entire clutch unit to be brought close to the shaft and thus have minimum diameter. The advantages of this are that it reduces the over-all size of the assembly; reduces the cost of the construction and the installation; reduces the noise of the gears due to the fact that the gears and all of the parts may be kept to normal size and thus have low peripheral speeds which are troublesome when the parts are enlarged in diameter to accommodate clutching members beyond the peripheral portions of the shafts.

Furthermore, by the provision of the teeth within the bore of the positive clutch member, these teeth may be made relatively narrow and thus permit a ready and easy engagement of them with the splines on the cooperating shaft. Moreover, with narrow teeth, their ends may be bevelled or otherwise formed to guide them into engagement with the like teeth on the co-operating shaft.

A further advantage in connection with having the teeth within the bore of the positive clutch member is that the teeth may be made relatively small for quick engagement and yet not be subject to breakage because the peripheral speed is not sufficient to damage them as would happen should small teeth be used beyond the periphery of the shaft where the speeds are greater. With the teeth in the bore of the positive clutch member and with said member bridging the joint between the shaft sections when connecting the same, the throw or movement of the positive clutch member to couple the shafts is materially reduced in that it is only required to move the clutch member to bridge the joint between the shafts. In reducing the throw of the positive clutch, the movement of the inner end portion of the control lever is consequently reduced with the result that the upper portion of the lever may be made longer and secure greater leverage within the standard range of throw.

The clutch member of the positive clutch is rotatably carried by the movable member of the friction clutch, thus permitting the member of the positive clutch to be located within the confines of the movable member of the friction clutch. The advantage of this is that space is conserved and the strength of the coupling materially enhanced because the positive clutch member may be of a diameter large enough to conform with that of the friction clutch which is the outside member of the unit. A further advantage of this arrangement is that the positive clutch member is located within the same space as provided for the friction clutch without increasing the over-all longitudinal length of the friction clutch.

In having the positive clutch member arranged at one side of the movable member of the friction clutch and with both members supported by the shafts, a relatively long bearing for the members on the shafts is provided, thus preventing the tilting or canting of these members as they are shifted longitudinally of the shaft. This insures a smooth and easy operation for the clutches and also serves to keep the movable member of the friction clutch central with respect to the fixed member thereof to prevent uneven wearing of the friction clutch. The positive clutch member in being rotatably mounted in the movable member of the friction clutch has the advantage of permitting the positive clutch member to cooperate with both shafts in making a connection, in that the positive clutch member may revolve within the friction clutch member which carries it without turning the carrying member when engaged with either or both of the shafts. Furthermore, in having this loose connection between the positive clutch member and its carrying element, the friction clutch member when engaged with its cooperating cone, may rotate relatively to the positive clutch member, and thus the latter may be splined on its supporting shaft, and always available for a splined connection with the other shaft.

The clutch construction of my invention being associated with the peripheral portion of the shafts makes it possible to have the shifter forks engage the shiftable members of the clutch units relatively close to the periphery of the shafts. This prevents the possibility of the shiftable members being canted or tilted to interfere with the easy and smooth operation of the devices, as well as avoiding undue heating or burning of the parts due to the lower peripheral speeds, especially when undue force or pressure is applied to effect a shift.

It will be noted from Fig. 1 that the positive clutch element 37 of the coupling B is normally supported by the hub 24 on the gear 23. This hub is splined similar to the splined portion 20 of the shaft 6, and the outer diameter of the hub is substantially the same as the outer portion of the splined portion 20 of said shaft. By having the positive clutch member 37 cooperating with the hub 24 of the gear 23 in the clutching of the gear to the shaft 6, it is possible to increase the length of the hub 24 for the purpose of providing a relatively long bearing for the gear on the shaft and thus prevent tilting or canting of the gear to produce noise or an undue wear on the teeth of the gear in the operation of the device. Furthermore, an undue length of hub is not required, and therefore the over-all length of the transmission assembly is not increased, due to the fact that the positive clutch member bridges or spans the joint between the hub and the splined portion 20 of the shaft 6, thereby dividing the length of the clutch between the hub and the splined portion of the shaft. In the appended claims, the reference to shafts, when describing one clutch assembly or unit, contemplates the shafts 5 and 6 of coupling A or shaft 6 and hub 24 of coupling B.

When the cam plate is in neutral position as shown in Fig. 1, the springs of the plungers 73 and 74 do not exert any pressure on the rollers 60, 61, and consequently no undue pressure is exerted on the forks 54, 55, with the result that the clutch mechanisms are not under load while in neutral position, and the forks will not be injured or will not be burned during the rotation of the associated parts. Moreover, the plungers when holding the cam plate in neutral position do so without any strain thereon, and in addition prevent the cam plate from accidental movement so that the shift lever 48 may be disengaged from the cam plate to perform its duties in connection with the other shift rod in effecting speed changes in low and reverse.

It is of course to be understood that the details of structure and arrangements of parts may be variously changed and modified without departing from the spirit and scope of my invention.

I claim:—

1. In a transmission mechanism, the combination with a driving shaft, of a driven shaft, and means for directly and indirectly coupling the shafts including a friction clutch and a positive clutch for each coupling, and means including a pivoted cam plate operatively connected to said couplings and a single control lever engaged with said plate to swing the latter for first closing the friction clutch of one coupling to synchronize the shafts and for subsequently opening the friction clutch and closing the positive clutch of said coupling while the other coupling remains open.

2. In a transmission mechanism, the combination with a driving shaft, of a driven shaft, means for directly and indirectly coupling the shafts including a friction clutch, a positive clutch for each coupling, and a gear loosely mounted on the driven shaft and means for operating said couplings including a shifter fork connected to the driven clutch member of each friction clutch, positive clutch members respectively bodily movable with the driven clutch members and disposed in constant positive engagement with the drive shaft and said gear and bodily movable to also positively engage the driven shaft, and a pivoted cam plate operatively connected to the shifter forks and movable in one direction to first close the friction clutch of one coupling to synchronize the shafts and to subsequently open said friction clutch and close the positive clutch while the other coupling remains open.

3. In a transmission mechanism, the combination with a driving shaft, of a driven shaft, means for directly and indirectly coupling the shafts including a friction clutch, a positive clutch for each coupling, and a gear loosely mounted on the driven shaft and means for operating said couplings including a shifter fork connected to the driven clutch member of each friction clutch, positive clutch members respectively bodily movable with the driven clutch members and disposed in constant positive engagement with the drive shaft and said gear and bodily movable to also positively engage the driven shaft, and a pivoted cam plate operatively connected to the shifter forks and movable in one direction to first close the friction clutch of one coupling to synchronize the shafts and to subsequently open said friction clutch and close the positive clutch while the other coupling remains open, said cam plate being movable in the opposite direction to first effect a closing of the friction clutch of the other coupling and to subsequently open said friction clutch and close the positive clutch while the first mentioned coupling remains open.

4. In a transmission mechanism, the combination with a driving shaft, of a driven shaft, means for directly and indirectly coupling the shafts including a friction clutch, a positive clutch for each coupling, and a gear loosely mounted on the driven shaft and means for operating said couplings including a shifter fork connected to the driven clutch member of each friction clutch, positive clutch members respectively bodily movable with the driven clutch members and disposed in constant positive engagement with the drive shaft and said gear and bodily movable to also positively engage the driven shaft, a pivoted cam plate operatively connected to the shifter forks and movable in one direction to first close the friction clutch of one coupling to synchronize the shafts and to subsequently open said friction clutch and close the positive clutch while the other coupling remains open, and a control lever having a separable interlocking connection with the cam plate and adapted to oscillate the latter when interlocked therewith.

5. In a transmission mechanism, the combination with a driving shaft, of a driven shaft, means for directly and indirectly coupling the shafts including a friction clutch, a positive clutch for each coupling, and a gear loosely mounted on the driven shaft and means for operating said couplings including a shifter fork connected to the driven clutch member of each friction clutch, positive clutch members respectively bodily movable with the driven clutch members and disposed in constant positive engagement with the drive shaft and said gear and bodily movable to also positively engage the driven shaft, a pivoted cam plate operatively connected to the shifter forks and movable in one direction to first close the friction clutch of one coupling to synchronize the shafts and to subsequently open said friction clutch and close the positive clutch while the other coupling remains open, said cam plate being movable in the opposite direction to first effect a closing of the friction clutch of the other coupling and to subsequently open said friction clutch and close the positive clutch while the first mentioned coupling remains open, and a control lever having a separable interlocking connection with the cam plate and adapted to oscillate the latter when interlocked therewith.

6. In a transmission mechanism, the combination with a driving shaft, of a driven shaft, means for directly and indirectly coupling the shafts including a friction clutch, a positive clutch for each coupling, and a gear loosely mounted on the driven shaft and means for operating said couplings including a shifter fork connected to the driven clutch member of each friction clutch, positive clutch members respectively bodily movable with the driven clutch members and disposed in constant positive engagement with the drive shaft and said gear and bodily movable to also positively engage the driven shaft, and a pivoted cam plate operatively connected to the shifter forks and movable in one direction to first close the friction clutch of one coupling to synchronize the shafts and to subsequently open said friction clutch and close the positive clutch while the other coupling remains open, said cam plate being provided on opposite sides of its pivot with oppositely arranged cam slots having operative connections with the respective shifter forks.

7. In a transmission mechanism, the combination with a driving shaft, of a driven shaft, means for directly and indirectly coupling the shafts including a friction clutch, a positive clutch for each coupling, and a gear loosely mounted on the driven shaft and means for operating said couplings including a shifter fork connected to the driven clutch member of each friction clutch, positive clutch members respectively bodily movable with the driven clutch members and disposed in constant positive engagement with the drive shaft and said gear and bodily movable to also positively engage the driven shaft, and a pivoted cam plate operatively connected to the shifter forks and movable in one direction to first close the friction clutch of one coupling to synchronize the shafts and to subsequently open said friction clutch and close the positive clutch while the other coupling remains open, said cam plate being provided on opposite sides of its pivot with oppositely arranged cam slots having operative connections with the respective shifter forks, each cam slot including a concentric portion and a communicating eccentric portion whereby the eccentric portion of one slot will be effective during pivotal movement of the plate in one direction while the concentric portion of the other slot will be ineffective during said movement of the plate.

8. In a transmission mechanism, the combination with a driving shaft, of a driven shaft, means for directly and indirectly coupling the shafts including a friction clutch, a positive clutch for each coupling, and a gear loosely mounted on the driven shaft and means for operating said couplings including a shifter fork connected to the driven clutch member of each friction clutch, positive clutch members respectively bodily movable with the driven clutch members and disposed in constant positive engagement with the drive shaft and said gear and bodily movable to also positively engage the driven shaft, a pivoted cam plate operatively connected to the shifter forks and movable in one direction to first close the friction clutch of one coupling to synchronize the shafts and to subsequently open said friction clutch and close the positive clutch while the other coupling remains open, said cam plate being provided on opposite sides of its pivot with oppositely arranged cam slots having operative connections with the respective shifter forks, and a control lever pivoted at a point directly above the pivot of the cam plate and having a sliding pivotal connection at its lower end with said plate at a point directly above the pivot thereof.

9. In a transmission mechanism, the combination with a driving shaft having a spline at its inner end; of a driven shaft disposed in alinement therewith and having a spline at its inner end; a gear journaled on the driven shaft adjacent the spline thereof and provided with a spline; a speed reduction gearing between the driving shaft and the gear for constantly rotating the latter; a high speed coupling for the shafts comprising a friction clutch and a positive clutch, the friction clutch including a driving clutch member fixed to the driving shaft and a driven clutch member having positive sliding engagement with the spline of the driven shaft, the positive clutch including a ring normally having positive sliding engagement with the spline of the driving shaft and movable by the driven clutch member into positive sliding engagement with the spine of the driven shaft; a reduced speed coupling for the shafts comprising a friction clutch and a positive clutch, the friction clutch including a driving clutch member fixed to the constantly rotating gear and a driven clutch member having positive sliding engagement with the spline of the driven shaft, the positive clutch including a ring normally having positive sliding engagement with the spline of the gear and movable by the driven clutch member into positive sliding engagement with the spline of the driven shaft; and means connected to both couplings for reciprocating the driven clutch member of one coupling only to close the friction clutch thereof during one reciprocatory stroke of said clutch member, and to first open the friction clutch and to then close the positive clutch of the same coupling during the other reciprocatory stroke of the clutch member.

10. In a transmission mechanism, the combination with a driving shaft having a spline at its inner end; of a driven shaft disposed in alinement therewith and having a spline at its inner end; a gear journaled on the driven shaft adjacent the spline thereof and provided with a spline; a speed reduction gearing between the driving shaft and the gear for constantly rotating the latter; a high speed coupling for the shafts comprising a friction clutch and a positive clutch, the friction clutch including a driving clutch member fixed to the driving shaft and a driven clutch member having positive sliding engagement with the spline of the driven shaft, the positive clutch including a ring normally having positive sliding engagement with the spline of the driving shaft and movable by the driven clutch member into positive sliding engagement with the spline of the driven shaft; a reduced speed coupling for the shafts comprising a friction clutch and a positive clutch, the friction clutch including a driving clutch member fixed to the constantly rotating gear and a driven clutch member having positive sliding engagement with the spline of the driven shaft, the positive clutch including a ring normally having positive sliding engagement with the spline of the gear and movable by the driven clutch member into positive sliding engagement with the spline of the driven shaft; and means connected to both couplings for reciprocating the driven clutch member of one coupling only to close the friction clutch thereof during one reciprocatory stroke of said clutch member, and to first open the friction clutch and to then close the positive clutch of the same coupling during the other reciprocatory stroke of the clutch member; said means including a cam plate pivoted to swing on an axis transverse to the longitudinal axis of the shafts and provided with opposite cam slots, each slot having a concentric portion and a communicating eccentric portion, and operating connections between the cam slots of the plate and the driven friction clutch members of the couplings.

11. In a transmission mechanism, the combination with a driving shaft having a spline at its inner end; of a driven shaft disposed in alinement therewith and having a spline at its inner end; a gear journaled on the driven shaft adjacent the spline thereof and provided with a spline; a speed reduction gearing between the driving shaft and the gear for constantly rotating the latter; a high speed coupling for the shafts comprising a friction clutch and a positive clutch, the friction clutch including a driving clutch member fixed to the driving shaft and a driven clutch member having positive sliding engagement with the spline of the driven shaft, the positive clutch including a ring normally having positive sliding engagement with the spline of the driving shaft and movable by the driven clutch member into positive sliding engagement with the spline of the driven shaft; a reduced speed coupling for the shafts comprising a friction clutch and a positive clutch, the friction clutch including a driving clutch member fixed to the constantly rotating gear and a driven clutch member having positive sliding engagement with the spline of the driven shaft, the positive clutch including a ring normally having positive sliding engagement with the spline of the gear and movable by the driven clutch member into positive sliding engagement with the spline of the driven shaft; and means connected to both couplings for reciprocating the driven clutch member of one coupling only to close the friction clutch thereof during one reciprocatory stroke of said clutch member, and to first open the friction clutch and to then close the positive clutch of the same coupling during the other reciprocatory stroke of the clutch member; said means comprising a horizontally disposed supporting rod located above said couplings, shifter forks slidable along said rod and respectively engaged with the driven friction clutch member of the couplings, a cam plate pivoted to swing on an axis transverse to the longitudinal axis of the shafts and provided with cam slots on opposite sides of the pivot of said plate, the shifter forks respectively having operative connections with said cam slots, and a control lever pivoted at a point above the pivot of the plate and having a slidable pivot connection at its lower end with said plate.

12. In a transmission mechanism, the combination with a driving shaft, of a driven shaft, and means for directly and indirectly coupling the shafts including a friction clutch and a positive clutch for each coupling, and means including a single control lever for first closing the friction clutch of one coupling to synchronize the shafts and for subsequently opening the friction clutch and closing the positive clutch of said coupling while the other coupling remains open, said means including shifter forks operatively connected to the respective couplings, a pivoted plate having opposite cam grooves therein engaged by the shifter forks, and a spring plunger mounted on the plate for automatically moving one of the forks in one direction during the first part of the movement of the control lever in a given direction to close the associated friction clutch and for positively moving the fork in a direction opposite to its first movement during continued movement of the lever in said given direction to first open the friction clutch and then close the positive clutch.

13. In a transmission mechanism, the combination with a driving shaft; of a normally disconnected driven shaft; a counter shaft; a speed reduction gear coupling positively connecting the driving shaft and the counter shaft; a normally open coupling between the drive and driven shafts including a friction clutch and a positive clutch; a normally open coupling between the counter shaft and the driven shaft including a friction clutch and a positive clutch; and a pivoted cam plate operatively connected to both couplings and movable in one direction to first close the friction clutch of one coupling and then open the same and close the positive clutch of the same coupling, while the other coupling remains open.

14. In a transmission mechanism, the combination with a driving shaft; of a normally disconnected driven shaft; a counter shaft, a speed reduction gear coupling positively connecting the driving shaft and the counter shaft; a normally open coupling between the drive and driven shafts including a friction clutch and a positive clutch; a normally open coupling between the counter shaft and the driven shaft including a friction clutch and a positive clutch; the friction clutch of the first mentioned coupling including a clutch member mounted to rotate with the driven shaft and slidable longitudinally thereof, the positive clutch of the first mentioned coupling including a toothed ring mounted on and bodily movable with said slidable friction clutch member and being directly mounted on the driving shaft to rotate therewith and to be moved longitudinally thereof into overlapping and positive engagement with the driven shaft; and a pivoted cam plate operatively connected to both couplings and movable in one direction to first close the friction clutch of one coupling and then open the same and close the positive clutch of the same coupling, while the other coupling remains open.

15. In a transmission mecanism, the combination with a driving shaft; of a normally disconnected driven shaft; a counter shaft; a speed reduction gear coupling positively connecting the driving shaft and the counter shaft; a speed reduction gear coupling between the driven shaft and the counter shaft including a gear loosely mounted on the driven shaft; a normally open coupling between the drive and driven shafts including a friction clutch and a positive clutch; a normally open coupling between the loosely mounted gear and the driven shaft and including a friction clutch and a positive clutch; and a pivoted cam plate operatively connected to both couplings and movable in one direction to first close the friction clutch of one coupling and then open the same and close the positive clutch of the same coupling, while the other coupling remains open.

16. In a transmission mechanism, the combination with a driving shaft; of a normally disconnected driven shaft; a counter shaft; a speed reduction gear coupling positively connecting the driving shaft and the counter shaft; a speed reduction gear coupling between the driven shaft and the counter shaft including a gear loosely mounted on the driven shaft; a normally open coupling between the drive and driven shafts including a friction clutch and a positive clutch; a normally open coupling between the loosely mounted gear and the driven shaft and including a friction clutch and a positive clutch; the friction clutch of the second mentioned coupling including a clutch member fixed to and rotatable with the loosely mounted gear and a cooperating clutch member fixed to rotate with the driven shaft and slidable longitudinally thereof, the positive clutch of the second mentioned coupling including a toothed ring mounted on and bodily movable with the slidable friction clutch member and being directly mounted on the loosely mounted gear to rotate therewith and to be moved longitudinally thereof into overlapping and positive engagement with the driven shaft; and a pivoted cam plate operatively connected to both couplings and movable in one direction to first close the friction clutch of one coupling and then open the same and close the positive clutch of the same coupling, while the other coupling remains open.

17. In a transmission mechanism, the combination with a driving shaft; of a normally disconnected driven shaft; a counter shaft; a speed reduction gear coupling positively connecting the driving shaft and the counter shaft; a normally open coupling between the drive and driven shafts including a friction clutch and a positive clutch; a normally open coupling between the counter shaft and the driven shaft including a friction clutch and a positive clutch; a pair of shifter forks respectively connected to the couplings; and a pivoted plate having separate cams cooperatively connected to the respective forks and adapted when moved in one direction to first close the friction clutch of one coupling and then open the same and close the positive clutch of the same coupling, while the other coupling remains open.

In testimony whereof I affix my signature.

LEON J. CAMPBELL.